United States Patent Office

3,286,399
Patented Nov. 22, 1966

3,286,399
PRODUCTION AND USE OF LIQUID MUSHROOM SPAWN
Alain Laniece, Saumur, France, assignor to Royal Champignon, Saumur, France, a company of France
No Drawing. Filed Mar. 18, 1964, Ser. No. 352,957
Claims priority, application France, Nov. 12, 1963, 953,373
5 Claims. (Cl. 47—1.1)

It is known that the culture of edible mushrooms can be carried out on a suitably prepared substrate and, in particular, in a bed of manure which has been subjected to a controlled fermentation intended to bring out the nutritive principles necessary for the growth of mushrooms. On such a prepared substrate it is the practice first of all to "interlard" with mushroom spawn, that is, to sow substrate with mycelium of the variety of mushroom which it is wished to cultivate, when the mycelium has attained a suitable stage of development.

All the mushroom spawn at present used in solid form, having been prepared on a solid culture medium (tobacco, grain, manure), this preparation being carried out over a period of from 30 to 60 days.

It would seem to be extremely desirable to prepare a mushroom spawn in liquid form; in fact, such a spawn could be more easily employed, and its dispersion for the purpose of sowing the culture substrate (manure) would be greatly superior to the dispersion achieved with solid spawn, with an increased effectiveness of sowing.

Although the culture of mycelium in a liquid medium ("submerged" culture) has been known since 1948, liquid spawn has been considered hitherto as unusable. Such is in principle the opinion of J. Szuecs, the American specialist on submerged culture, who believes that the mycelium obtained by submerged culture will not take on a bed of manure "at least in non-sterile conditions" (Mushroom Science, III (1956), page 269 to 279). In fact, it has been confirmed experimentally that mycelium obtained in a liquid medium without precautions or special conditions will not develop on a normal (non-sterile) bed of manure.

It has been discovered, after numerous trials, that under certain conditions and for certain species of mushroom it is possible to produce, starting from spores or mycelium in liquid media, liquid mushroom spawn suitable for the effective sowing of a bed of manure or indeed of any other substrate on which mushooms can grow.

More precisely, the invention concerns a liquid culture medium for the production of liquid mushroom spawn after sowing with mycelium or spores, characterised in that its carbohydrate content is constituted solely by substances having carbon chains of high molecular weight and that its nitrogen content is present in amine form.

By "substances having carbon chains of high molecular weight" is to be understood substances having carbon chains including at least twelve carbon atoms.

For example, the carbohydrate content may be constituted by starch, inulin, flours, hemicelluloses, lignins, free or combined fatty acids and so forth, and the nitrogen may be present in the form of amino-acids, peptides or proteins. By "flours" is meant bakery flour of wheat, barley, maize and so forth.

Such a medium sown with spores or mycelium is transformed after several days into liquid mushroom spawn in such a condition that the stocks may be properly selected. Among the stocks giving satisfactory results may be cited: Agaricus hortensis, Pleurotus ostreatus, Tricholoma nudum, Morchella hortensis, Morchella esculenta, Cantharellus cibarius, Clutocybe odora.

The mushroom spawn thus prepared in liquid form can be used with success for sowing a culture medium of the corresponding mushrooms (a bed of manure), on condition that it is collected and used when the liquid no longer contains either hydrocarbon products or detectable nitrogen. If this condition is respected, the "recovery" of spawn dispersed on a bed of manure is identical to that of other spawns.

By way of precise example, but not of limitation there will now be described the production of three types of liquid spawn.

Example 1

In order to obtain about 10 litres of liquid spawn of agaric there is dispersed in 10 litres of ordinary water at 80° C.:

| | Grams |
|---|---|
| Yeast extract | 50 |
| Starch | 150 |
| Maize gluten | 150 |

(This composition being given as a guide.)

The pH value of the solution is adjusted to 7 by means of soda and, after sterilization, the medium is sown with spores of agaric or agaric mycelium (obtained for example from a preceding operation). After 5 to 6 days the test for starch and nitrogen in a little of the filtered broth become negative and the medium can be collected. It is directly dispersed on the bed of manure and the recovery of the spawn is identical to that of the other spawns.

Example 2

To obtain 10 litres of liquid spawn of *Pleurotus ostreatus* there is dispersed in about 10 litres of ordinary water at 80° C.:

| | Grams |
|---|---|
| Yeast extract, "Fould-Springer" | 50 |
| Dried blood | 250 |
| Maize flour | 250 |
| Mono-potassium phosphate | 5 |

The pH is adjusted to 7 with sodium hydroxide and, after sterilization, mycelium of *Pleurotus ostreatus* is sown. After 6 to 8 days, the tests for starch and proteinic nitrogen in the medium become negative and it may be collected.

Example 3

To about 10 liters of ordinary water is added:

| | Grams |
|---|---|
| Yeast extract, "Fould-Springer" | 25 |
| "Corn-Steep," atomised | 25 |
| Casein hydrolysate | 100 |
| Sodium chloride | 10 |
| Starch | 150 |
| Calcium carbonate | 50 |

After sterilization this is sown with mycelium of *Morchella hortensis* or *Morchella esculenta* and, the same tests having been carried out, it can be collected at the end of three to four days.

It should be understood that the media yielded by the three examples are not exclusive and that one can replace the dried blood by other proteins such as casein, fish meal, hydrolysed gelatine and so forth. Similarly the maize flour can be replaced by wheat flour or barley flour or by starch.

The liquid spawn according to the invention can be handled and used much more easily than the solid spawn normally used, since the dispersion in the culture substrate can be carried out much better in the case of a liquid spawn than in the case of a solid spawn. Moreover the production of liquid spawn is much more rapid than with a solid spawn (a few days for the liquid spawn, 30–60 days for solid spawn) which in particular ensures that its cost price is but little increased.

What is claimed is:

1. A process for the preparation of mushroom spawn in liquid form comprising: sowing mushroom propagative material in a liquid culture medium; allowing mycelium to develop until said medium contains neither carbohydrate nor detectable nitrogen; and collecting the liquid spawn so produced.

2. A process of spawning mushroom beds with mushroom spawn in liquid form comprising: preparing a liquid culture medium containing carbohydrate solely in the form of substances having carbon chains of high molecular weight and nitrogen present colely in amino form; sowing said medium with mushroom propagative tissue; allowing mycelium to develop; testing said medium for carbohydrate and nitrogen content; when said tests become negative collecting the liquid spawn so produced; and dispersing it on a bed of substrate.

3. A process for the preparation of mushroom spawn in liquid form comprising: dispersing in water at least one carbohydrate having in its molecule carbon chains of at least twelve carbon atoms, and at least one nitrogenous compound selected from the group consisting of amino-acids, peptides and proteins; sowing the liquid culture medium so produced with mushroom propagative tissue; allowing mycelium to develop; testing said medium for carbohydrate and detectable nitrogen; and when said tests are negative collecting the liquid spawn produced.

4. A process for the preparation of mushroom spawn in liquid form comprising: dispersing in water at least one carbohydrate selected from the group consisting of starch, inulin, flours, hemicelluloses and lignins and at least one nitrogenous compound selected from the group consisting of amino-acids, peptides and proteins; adjusting the pH value of the medium so produced to about 7; sowing said medium with mushroom propogative material selected from the group consisting of mycelium and spores; allowing mycelium to develop; testing said medium at spaced instants of time to determine the presence of carbohydrates and proteinic nitrogen; and when the results of one of said tests are negative collecting the liquid spawn produced.

5. A process according to claim 4 in which said propagation material belongs to a species or variety selected from the group consisting of *Agaricus hortensis, Pleuratus ostreatus, Tricholoma nudum, Morchella hortensis, Morchella esculenta, Cantharellus cibarius, Clutocybe odora*.

References Cited by the Examiner

UNITED STATES PATENTS

| | | | |
|---|---|---|---|
| 2,260,201 | 10/1941 | Stroller | 47—1.1 |
| 2,338,259 | 1/1944 | Rettew | 71—5 |

ABRAHAM G. STONE, *Primary Examiner.*

R. E. BAGWILL, *Assistant Examiner.*